US008218830B2

(12) United States Patent
Gavin et al.

(10) Patent No.: US 8,218,830 B2
(45) Date of Patent: Jul. 10, 2012

(54) IMAGE EDITING SYSTEM AND METHOD

(75) Inventors: Andrew Gavin, Pacific Palisades, CA (US); Scott Shumaker, Los Angeles, CA (US); Ben Stragnell, Playa Del Rey, CA (US)

(73) Assignee: MySpace LLC, Beverly Hills, CA (US)

( * ) Notice: Subject to any disclaimer, the term of this patent is extended or adjusted under 35 U.S.C. 154(b) by 1105 days.

(21) Appl. No.: 12/022,114

(22) Filed: Jan. 29, 2008

(65) Prior Publication Data
US 2008/0181512 A1 Jul. 31, 2008

Related U.S. Application Data

(60) Provisional application No. 60/898,201, filed on Jan. 29, 2007, provisional application No. 60/913,204, filed on Apr. 20, 2007.

(51) Int. Cl.
*G06K 9/00* (2006.01)
(52) U.S. Cl. .......................................... 382/118; 382/311
(58) Field of Classification Search .................... 382/118
See application file for complete search history.

(56) References Cited

U.S. PATENT DOCUMENTS

| | | | |
|---|---|---|---|
| 5,878,141 A | 3/1999 | Daly et al. | |
| 5,892,915 A | 4/1999 | Duso et al. | |
| 5,956,716 A | 9/1999 | Kenner et al. | |
| 6,078,929 A | 6/2000 | Rao | |
| 6,269,394 B1 | 7/2001 | Kenner et al. | |
| 6,320,600 B1 | 11/2001 | Smith et al. | |
| 6,564,380 B1 | 5/2003 | Murphy | |
| 6,633,918 B2 | 10/2003 | Agarwal et al. | |
| 6,654,506 B1 | 11/2003 | Luo et al. | |
| 6,710,785 B1 | 3/2004 | Asai et al. | |
| 6,952,221 B1 | 10/2005 | Holtz et al. | |
| 6,993,787 B1 | 1/2006 | Kamel et al. | |
| 7,034,848 B2 * | 4/2006 | Sobol | 345/620 |
| 7,058,721 B1 | 6/2006 | Ellison et al. | |
| 7,158,676 B1 | 1/2007 | Rainsford | |
| 7,174,561 B2 | 2/2007 | Bixby et al. | |
| 7,188,088 B2 | 3/2007 | Iwata et al. | |
| 7,302,274 B2 | 11/2007 | Makela et al. | |

(Continued)

FOREIGN PATENT DOCUMENTS

JP  2006270587  10/2006

OTHER PUBLICATIONS

Furini, et al., An Audio/Video Analysis Mechanism for Web Indexing, ACM, May 22-26, 2006, pp. 1-2.

(Continued)

*Primary Examiner* — Sath V Perungavoor
(74) *Attorney, Agent, or Firm* — Gates & Cooper LLP

(57) ABSTRACT

An image editing system for use with a web-based video editing system is provided. The image editing system comprises: a detection system configured to receive image data; detect regions of the image representing faces; store the data representing the coordinates of the faces as points of interest; and receive user input adding additional points of interest, modifying the points of interest, or deleting the pre-selected points of interest; and a cropping subsystem configured to determine the portion of the image containing the maximum number of points of interest that will fit within the crop area; and crop the image.

6 Claims, 8 Drawing Sheets

U.S. PATENT DOCUMENTS

| | | | |
|---|---|---|---|
| 7,356,575 B1 | 4/2008 | Shapiro | |
| 7,508,961 B2 * | 3/2009 | Chen et al. | 382/118 |
| 7,606,926 B1 | 10/2009 | Chen et al. | |
| 7,620,073 B2 | 11/2009 | Robinett et al. | |
| 7,882,519 B2 | 2/2011 | Wachtfogel et al. | |
| 2001/0049715 A1 | 12/2001 | Kidder | |
| 2002/0032663 A1 | 3/2002 | Messner | |
| 2002/0114535 A1 * | 8/2002 | Luo | 382/282 |
| 2002/0116716 A1 | 8/2002 | Sideman | |
| 2002/0156910 A1 | 10/2002 | Senda | |
| 2003/0023564 A1 | 1/2003 | Padhye et al. | |
| 2003/0028873 A1 | 2/2003 | Lemmons | |
| 2003/0122862 A1 | 7/2003 | Takaku et al. | |
| 2003/0140159 A1 | 7/2003 | Campbell et al. | |
| 2003/0146915 A1 | 8/2003 | Brook et al. | |
| 2003/0234803 A1 | 12/2003 | Toyama et al. | |
| 2003/0234805 A1 | 12/2003 | Toyama et al. | |
| 2004/0179719 A1 * | 9/2004 | Chen et al. | 382/118 |
| 2004/0228528 A1 * | 11/2004 | Lao | 382/167 |
| 2005/0025387 A1 * | 2/2005 | Luo | 382/298 |
| 2005/0084232 A1 | 4/2005 | Herberger et al. | |
| 2005/0114462 A1 | 5/2005 | Mathew et al. | |
| 2005/0132293 A1 | 6/2005 | Herberger et al. | |
| 2005/0210393 A1 | 9/2005 | Maeng | |
| 2005/0248681 A1 * | 11/2005 | Nozaki et al. | 348/345 |
| 2005/0276477 A1 * | 12/2005 | Lin et al. | 382/173 |
| 2005/0278636 A1 | 12/2005 | Nomoto | |
| 2005/0283547 A1 | 12/2005 | Parry et al. | |
| 2006/0023969 A1 | 2/2006 | Lara et al. | |
| 2006/0026507 A1 * | 2/2006 | Balinsky et al. | 715/517 |
| 2006/0074769 A1 | 4/2006 | Looney et al. | |
| 2006/0095944 A1 | 5/2006 | Demircin et al. | |
| 2006/0129933 A1 | 6/2006 | Land et al. | |
| 2006/0156219 A1 | 7/2006 | Haot et al. | |
| 2006/0168303 A1 | 7/2006 | Oyama et al. | |
| 2006/0184980 A1 | 8/2006 | Cole | |
| 2006/0206526 A1 | 9/2006 | Sitomer | |
| 2006/0238827 A1 | 10/2006 | Ikeda et al. | |
| 2006/0253542 A1 | 11/2006 | McCausland et al. | |
| 2006/0288392 A1 | 12/2006 | Fleming | |
| 2007/0038703 A1 | 2/2007 | Tendjoukian et al. | |
| 2007/0189708 A1 | 8/2007 | Lerman et al. | |
| 2008/0052090 A1 | 2/2008 | Heinemann et al. | |
| 2008/0143875 A1 | 6/2008 | Scott et al. | |
| 2008/0172704 A1 | 7/2008 | Montazemi | |
| 2009/0167883 A1 * | 7/2009 | Nozaki | 348/222.1 |
| 2009/0196570 A1 | 8/2009 | Dudas et al. | |

OTHER PUBLICATIONS

"MyHeritage face recognition", http://web.archive.org/web/20061018223823/www.myheritage.com/FP/Company/face-rec...; dated Aug. 25, 2008; 2 pages.

"Riya—Visual Search"; http://www.riya.com/learnMore; dated Aug. 25, 2008; 7 pages.

International Search Report for Application No. PCT/US08/52367 filed Jan. 29, 2008, dated Apr. 9, 2008, mailed May 2, 2008, 2 pages.

Written Opinion for Application No. PCT/US08/52367 filed Jan. 29, 2008, dated Apr. 9, 2008, mailed May 2, 2008, 3 pages.

"iMovie HD Tutorial: Apple—iLife—Tutorials—iMovie HD—Arranging Your Clips;" http://www_apple.com/ilife; dated Oct. 9, 2006, 6 pages.

International Search Report and Written Opinion for PCT/US08/01138 dated Jun. 11, 2008, 6 pages.

International Search Report and Written Opinion for PCT/US08/01139 dtd May 14, 2008, 6 pages.

International Search Report and Written Opinion for PCT/US08/01130 dated Jun. 18, 2008, 6 pages.

International Search Report and Written Opinion for PCT/US08/62309 dated Jul. 2, 2008, 6 pages.

"Jumpcut—Create;" http://www.jumpcut.com/create/edit; dated Oct. 16, 2006, 3 pages.

"MAGIX;" http://site.magix.net; dated Oct. 12, 2006; 11 pages.

"Oddcast—MediaMixers;" http://oddcast.com/home; http://videomixer.chysler.com/chrvideomixer.php?door=28&src=vm2chrysler.swf; dated Oct. 16, 2006, 20 pages.

"Planning and Using Informercial Campaigns Effectively" dated Sep. 1, 1995 by Gene Silverman and published in Direct Marketing (hereinafter "Silverman"), pp. 1 to 8, 37 pages.

"Welcome to eyespot;" http://www.eyespot.com; dated Oct. 12, 2006, 8 pages.

* cited by examiner

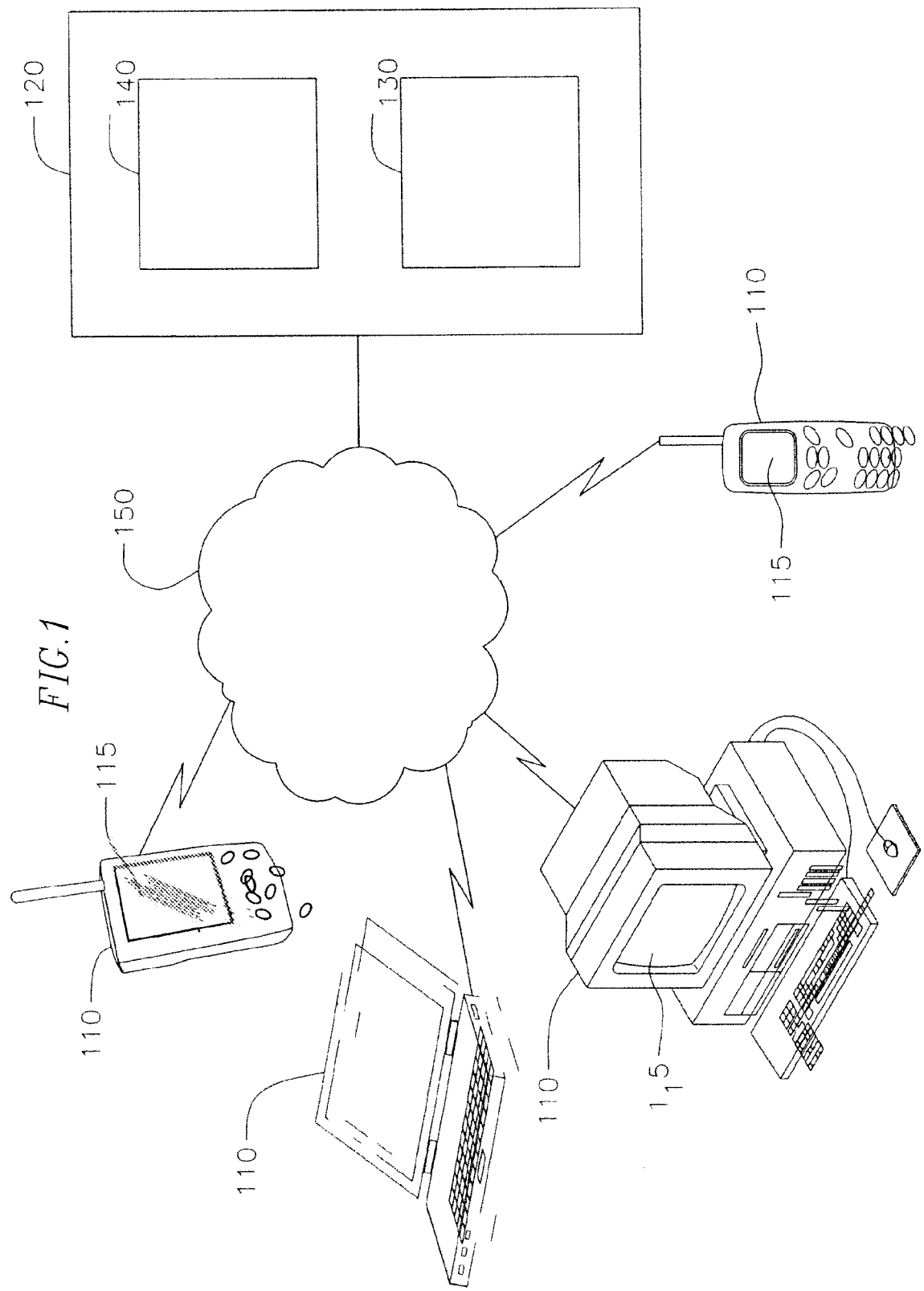

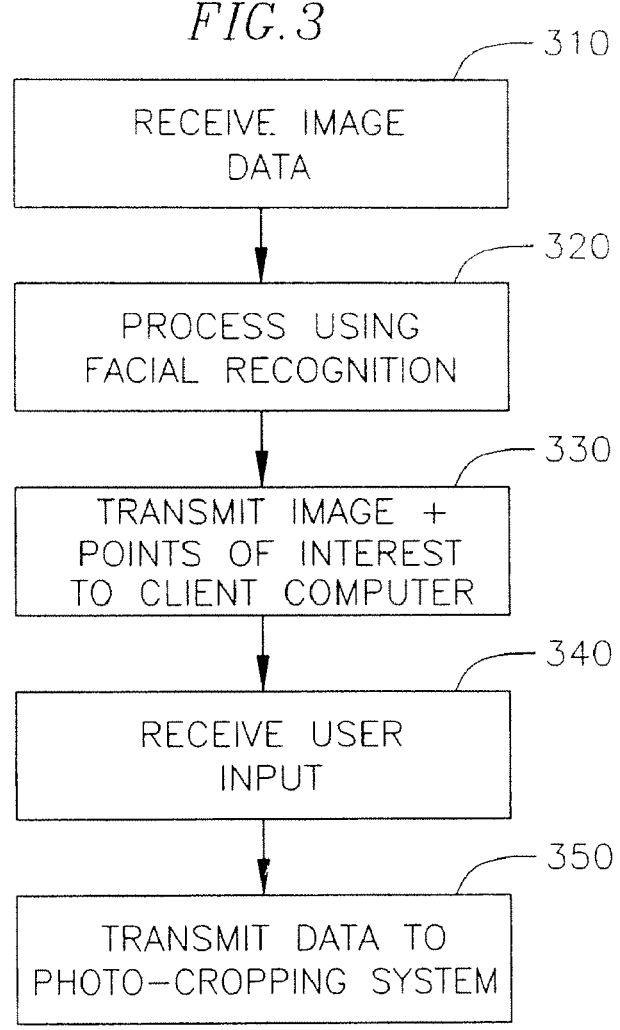
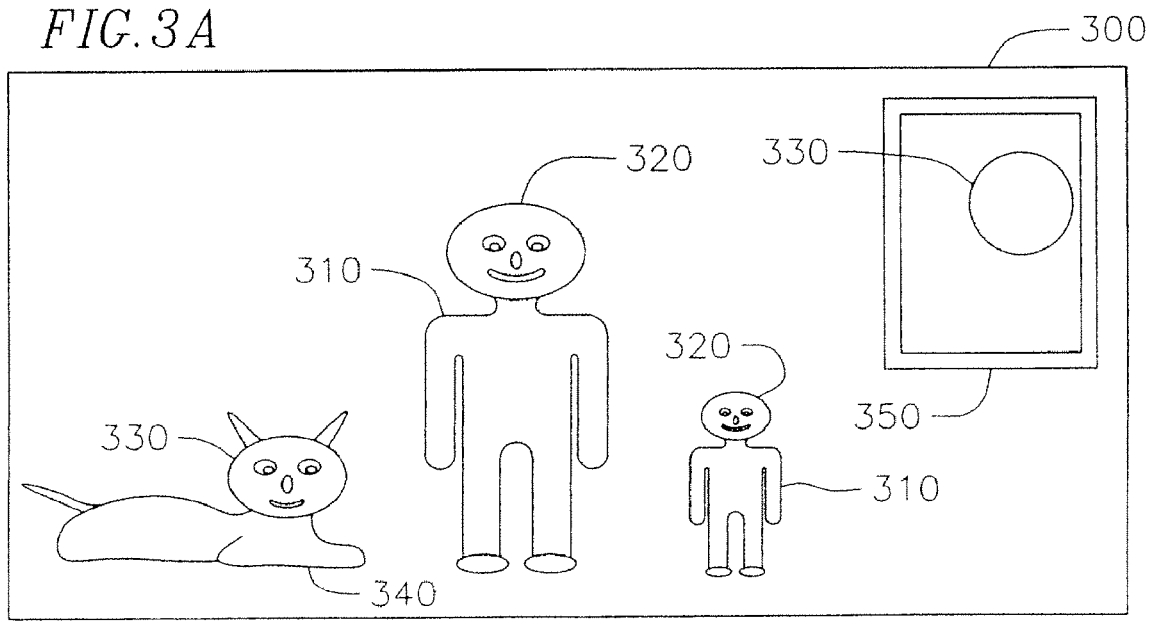

IMAGE EDITING SYSTEM AND METHOD

This application claims priority to and the benefit of U.S. Provisional Application No. 60/898,201, filed on Jan. 29, 2007 and U.S. Provisional Application No. 60/913,204, filed on Apr. 20, 2007, which is incorporated by reference as if set forth in full herein. This application is also related to the co-pending U.S. Provisional Application No. 60/897,552, filed on Jan. 26, 2007, titled "Video Downloading and Scrubbing System and Method", U.S. Provisional Patent Application No. 60/897,558, filed on Jan. 26, 2007, titled "Real Time Online Video Editing System and Method", U.S. Provisional Patent Application No. 60/897,559, filed on Jan. 26, 2007, titled "Payment System and Method for Web-Based Video Editing System", U.S. Provisional Patent Application No. 60/897,544, filed on Jan. 26, 2007, titled "System and Method for Editing Web-Based Video", and U.S. Provisional Patent Application No. 60/915,427, filed on May 1, 2007, titled "System and Method for Flow Control in Web-Based Movie Editing System", the entire contents of each of which are expressly incorporated herein by reference.

FIELD OF THE INVENTION

The present invention relates to an image editing system, and more particularly, to a system for detecting and editing points of interest on images and manipulating those images using the points of interest for specific applications such as cropping, animation, and navigation.

BRIEF DESCRIPTION OF THE DRAWINGS

FIG. 1 is a block diagram of a web-based video editing system according to a first embodiment of the present invention.

FIG. 3 is a flowchart showing a method of operation for the detection subsystem. In some embodiments, the subsystem receives data pertaining to a particular image in the system.

FIG. 3a shows a sample image containing points of interest. In this example, the image contains two figures with recognizable human faces.

DETAILED DESCRIPTION OF THE INVENTION

Figure 1A:
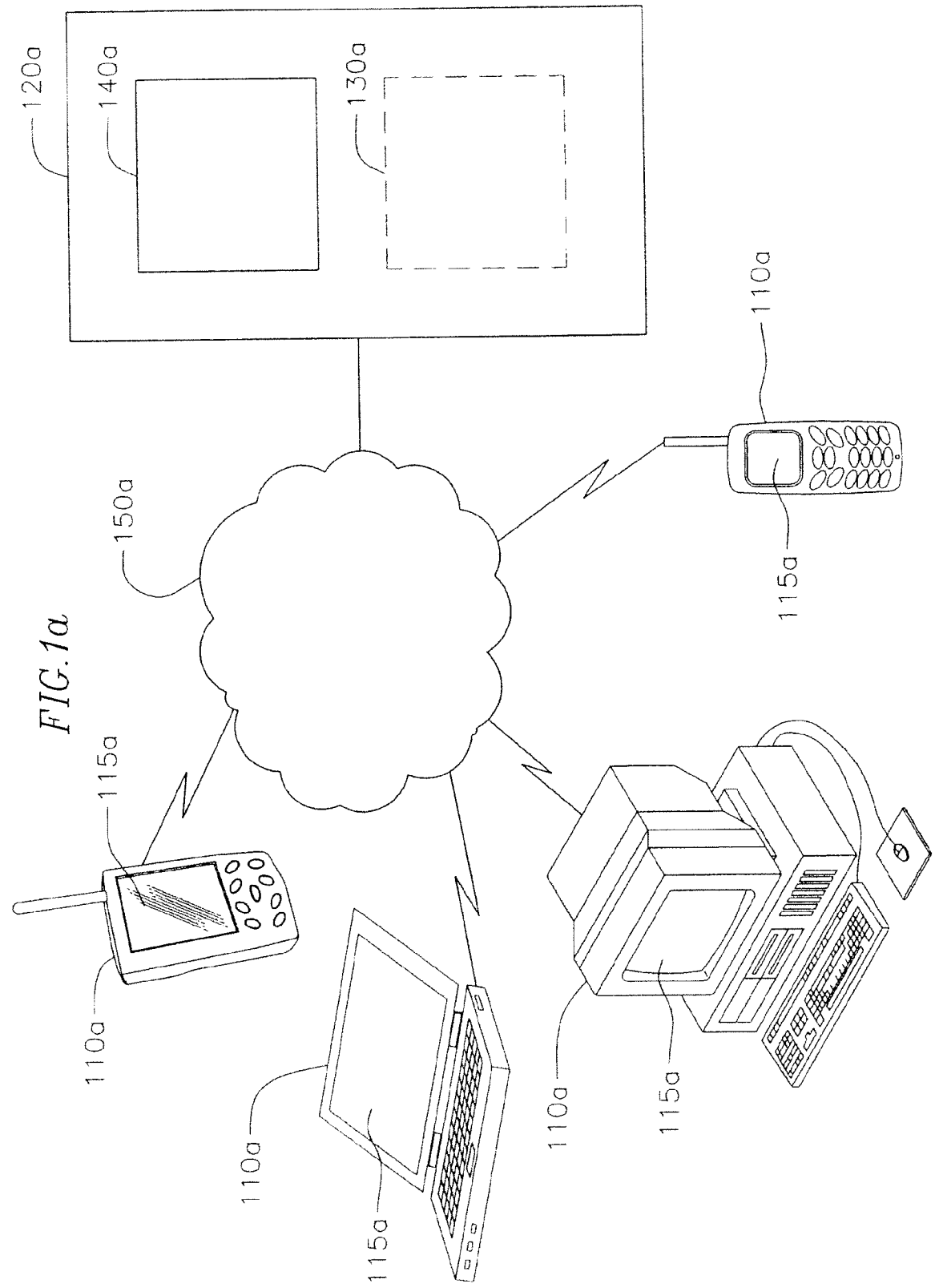
FIG. 1a is a block diagram of a web-based video editing system according to a second embodiment of the present invention.

FIG. 1 is a block diagram of a web-based video editing system according to a first embodiment of the present invention. The editing system includes one or more communication devices 110 each having a graphical user interface 115, a server 120 having a connection manager 130 and a image editing system 140 operating on the server, and a network 150 over which the one or more communication devices and the server communicate. The communication devices include, but are not limited to, a personal computer, a mobile telephone, a PDA, or any other communication device configured to operate as a client computer to the server. The network to which the server and devices are coupled may be a wireless or a wireline network and may range in size from a local area network to a wide area network to the Internet. A dedicated open socket connection exists between the connection manager and the client computers.

In some embodiments of the system, one or more client computers are configured to transmit information to and receive information from the server. In some embodiments, each of the client computers is configured to send a query for information and the server is configured to respond to the query by sending the requested information to the client computer. In some embodiments, one or more of the client computers is configured to transmit commands to the server and the server is configured to perform functions in response to the command.

In some embodiments, each of the client computers is configured with an application for displaying multimedia on the graphical user interface of the client computer. The application may be Adobe Flash® or any other application capable of displaying multimedia.

The connection manager is configured to determine the condition of the server and perform asynchronous messaging to one or more of the client computers over the dedicated open socket connection. In some embodiments, the content of the messages is indicative of the state of the server.

The server is configured to receive requests from one or more of the client computers and perform functions in response to the received requests. The server performs any number of functions typically performed in the server of a web-based video editing system. The server also provides an image editing system for the web-based video editing system.

FIG. 1a is a block diagram of some embodiments of the web-based video editing system of FIG. 1. In these embodiments, the system does not include a connection manager 130a for communication between the client computer 110a and the server 120a. Otherwise, client computer 110a is an instance of client computer 110, graphical user interface 115a is an instance of graphical user interface 115, server 120a is an instance of server 120, image editing system 140a is an instance of image editing system 140, and internet 150a is an instance of internet 150. All the components in FIG. 1a are thus identical to those in FIG. 1, and they are all configured to operate as described in FIG. 1.

In some embodiments, still referring to FIGS. 1 and 1a, the combination of data representing specified portions of an image is sometimes referred to as a point of interest. These points of interest may take the shape of a square, rectangle, or other quadrilateral, a circle, an ellipse, or any other closed two-dimensional shape. A user operates the client computer 110 to manage and manipulate points of interest on a computer image. The user can add, reposition, and resize points of interest through the graphical user interface 115. In some embodiments, the server 120 automatically detects points of interest by using algorithms such as face detection and feature recognition. The server-generated points of interest are also presented to the user in a graphical fashion, allowing the user to adjust their size and position and remove false positives or undesired interest points in an identical fashion to the points added by the user. Once these points of interest have been saved, they are stored in a database on the server along with the image and used appropriately as the image is displayed in different contexts.

In some embodiments, still referring to FIGS. 1 and 1a, when the image needs to be displayed with a different aspect-ratio, the points of interest are used to crop the image to best fit the new aspect ratio.

In some embodiments, users can choose to present the image in an animated fashion, and the client computer will use the points of interest to intelligently pan around the image and focus on parts of the image.

In some embodiments, the points of interest become 'hot spots' suitable for web-based navigation.

Figure 2:
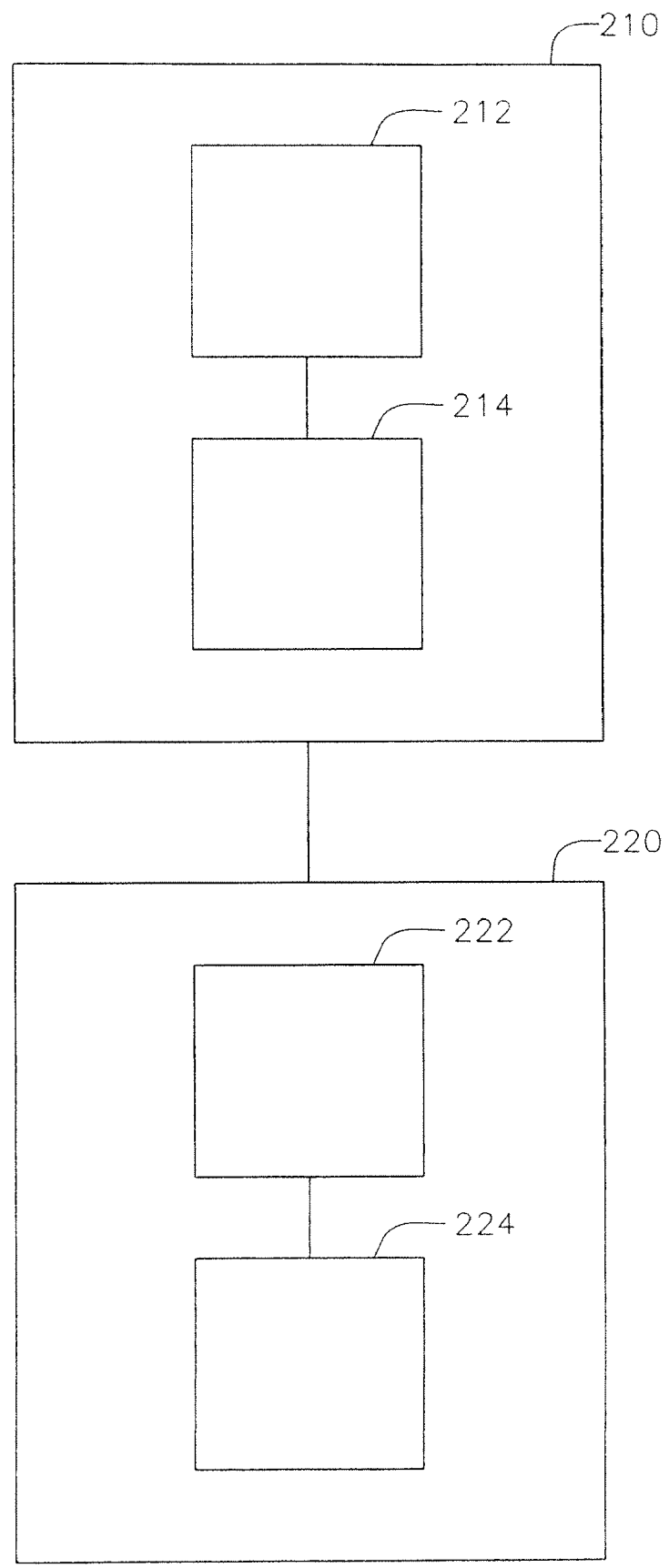
FIG. 2 is a block diagram of one embodiment of an image editing system of the web-based video editing system of FIG. 1.

FIG. 2 is a block diagram of one embodiment of an image-editing system 140 of the web-based video editing system of FIG. 1. The image editing system includes a detection subsystem 210. In some embodiments, the detection subsystem includes a processor 212, memory 214, and computer code product including instruction stored in the memory and adapted to cause the processor, and thereby the detection subsystem, to receive and process user point of interest detection and selection requests. The memory also stores information indicative of the user selection requests. The memory may be any type of read-write memory, including, but not limited to, random access memory.

In some embodiments, the user input received by the detection subsystem includes the identity of the user, the image to be cropped, the size to which the image is to be cropped, and the points of interest edited by the user and/or generated by the server and stored on the server in an earlier stage. Each point of interest consists of a rectangular region of the image that encompasses the point of interest, although in some embodiments this point could be a circle (position and radius) or any other closed two-dimensional shape.

The data is be stored in the editing system server (not shown), the detection subsystem memory 214, or at a remote location connected to the network of FIG. 1. The data is provided by the web-based video editing system or is data generated by the user. The data may include uncropped images, cropped images, meta data for cropping the images, and points of interest.

In some embodiments, the system includes an animation subsystem configured to examine the points of interest and present an intelligent fly through of the image. In some embodiments, the system includes a navigation subsystem that allows a user to annotate the points of interest with text boxes and hyperlinks.

FIG. 3 is a flowchart showing a method of operation for the detection subsystem. In some embodiments, the subsystem receives 310 data pertaining to a particular image in the system. This data is a pointer to a file on the server, a pointer to a file stored in a remote location connected to the server by the network in FIG. 1, the actual data for the image, or any other data that would allow the subsystem access to the image data. The subsystem then processes 320 the image using a facial recognition detection algorithm to determine all of the faces in the image and creates points of interest for each of the detected faces. Depending on the embodiment, the subsystem either transmits (not shown) the data to the image editing system, or the subsystem transmits 330 the data to the client computer. If the subsystem transmits 330 the data to the client computer, the client computer displays the image alone with markers indicating each of the automatically selected points of interest. The system then receives 340 input from the user indicating any changes to the selected points of interest that he desires. For example, the user may remove some of the pre-selected points of interest, or the user may add additional points of interest. The additional points of interest may include any particular features of the image in addition to the automatically detected faces that the user wishes to have included in the cropped image. Once the subsystem receives 340 this input, it transmits 350 the data for the points of interest to the image editing system.

FIG. 3a shows a sample image containing points of interest. In this example, the image 300 contains two figures 310 with recognizable human faces. When the detection subsystem processes this image, it automatically applies points of interest 320 to these faces. In some embodiments where the user may add or delete points of interest, the image also contains points of interest 330 added by the user so that a pet 340 and a painting 350 are also marked as being important in the image and thus represent visuals within in the image that the user desires to include in the final cropped image.

Figure 4:
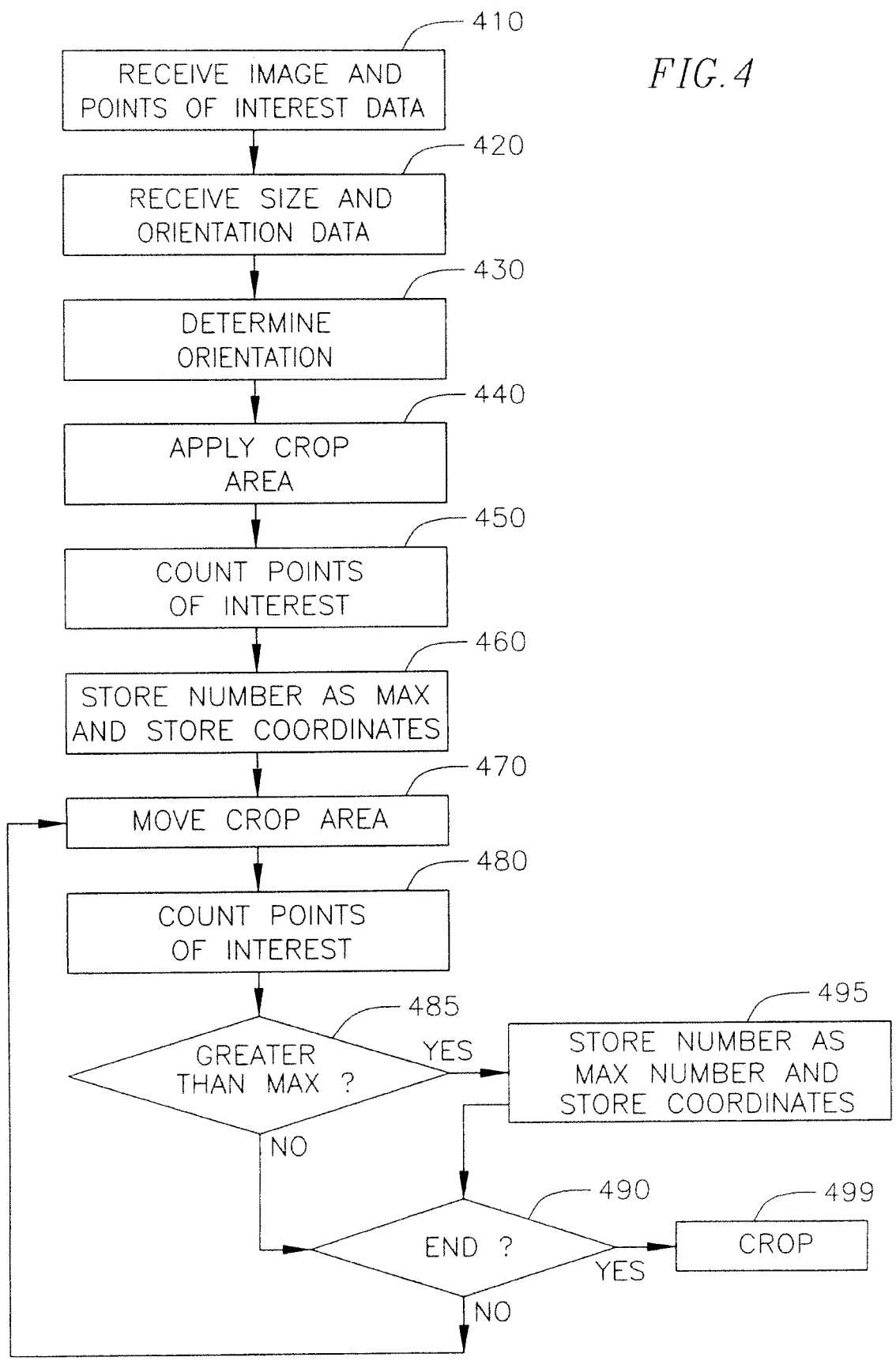
FIG. 4 shows a flowchart for a method of operation to automatically crop an image using data for predetermined points of interest in the image.

FIG. 4 shows a flowchart for a method of operation to automatically crop an image using data for predetermined points of interest in the image. In some embodiments, the image editing system receives 410 data pertaining to points of interest either automatically generated or generated by the user and data pertaining to the image to be cropped. The system farther receives 420 data pertaining to the size and orientation to which the image is to be cropped. Based on this data, the system determines 430 whether to crop the image along its height or along its width. The system then analyzes every valid configuration of the crop rectangle by beginning 440 at one side of the image. The system examines 450 the locations of the points of interest in relation to the position of the crop rectangle, and assigns 460 a score to the current crop rectangle configuration. In assigning the score, the system tries to maximize the area of points of interest displayed inside the crop rectangle, to avoid partially cropping a point of interest and cutting it off. In some embodiments, the system also adjusts the score to display the points of interest in accordance with basic photographic rules, such as the rule of thirds, centering, framing, balance, rotation such that all faces in the image are vertical, use of the golden-ratio, etc. When a point of interest is entirely within the crop rectangle, its contribution to the score is proportional to its area. Points of interest entirely outside the crop rectangle do not contribute to the score, and points of interest only partially inside the crop rectangle subtract from the overall score. In some embodiments applying photographic rules, such as the rule of thirds, the photographic rules contribute small amounts to the score. In some embodiments, the photographic rules contribute just enough to the score to allow the system to choose between crop configurations that would otherwise be tied. Once the system has assigned 460 a score to the current configuration, it determines 470 whether it has reached the other end of the image. If the system has not reached the other end, it moves 480 the crop area by one pixel, analyzes 450 the current position, and assigns 460 it a score. If instead, the system determines 470 that it has reached the end of the image, it selects 490 and stores the crop configuration with the highest score. The system may then crop the image accordingly.

In some embodiments, the system also allows the user to preview the cropped image overlaid on the original image and adjust the cropped region.

Figure 5A:
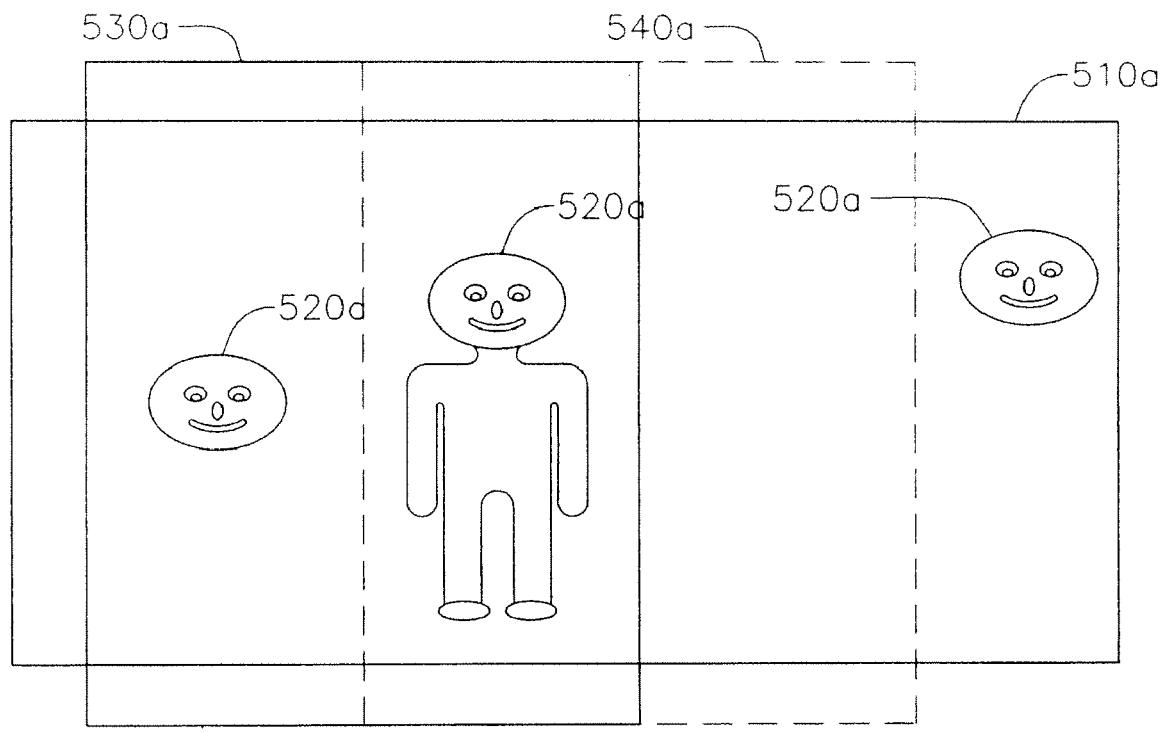
FIG. 5a is a visual representation of the method by which image data in a landscape orientation is processed for photo-cropping.

FIG. 5a is a visual representation of the method by which image data in a landscape orientation is processed for photo-cropping. The image 510a contains three points of interest 520a. When the system processes this image for cropping, it begins with the cropping area 530a at the left side of the image and walks it over to the right side pixel by pixel. As can be seen in the figure, when the cropping area is in position 530a, two points of interest are captured; however, when it is in position 540a, only one point of interest is captured. Thus, when the system crops this image, it will crop it at position 530a.

Figure 5B:
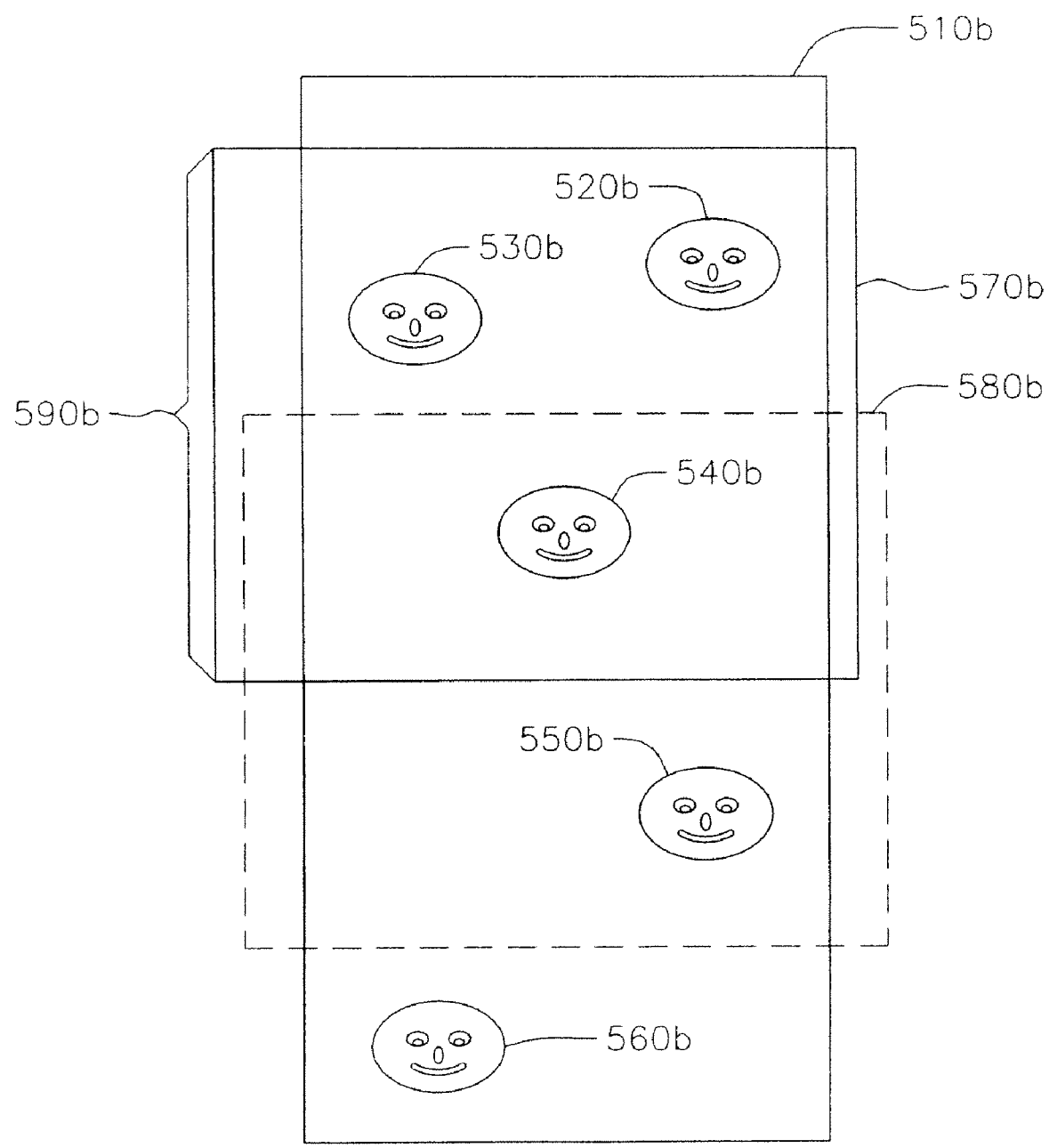
FIG. 5b is a visual representation of a method by which image data in a portrait orientation is processed for photo-cropping.

FIG. 5b is a visual representation of a method by which image data in a portrait orientation is processed for photo-cropping. The image 510b contains five points of interest 520b, 530b, 540b, 550b, and 560b. When the image is processed for cropping, the cropping area 590b moves from top to bottom in search of the area that contains the most points of interest. In this case, position 570b contains three complete points of interest and therefore has the highest concentration. The next highest concentration is found in position 580b, which only has two complete points of interest. Thus, when the system crops this image, it will crop it at the coordinates corresponding to the cropping area in position 570b.

Figure 5C:
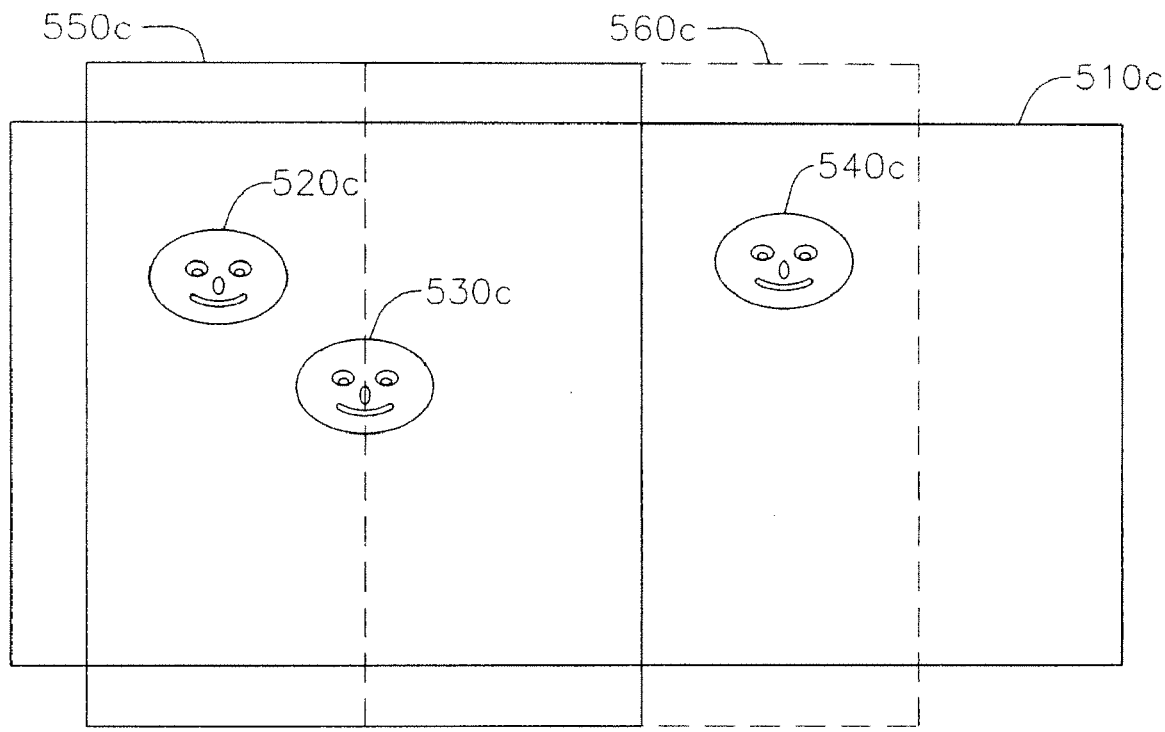
FIG. 5c is a visual representation of a method by which image data is processed for photo-cropping.

FIG. 5c is a visual representation of a method by which image data is processed for photo-cropping. The image 510c in FIG. 5c is processed much in the same manner as discussed in reference to FIGS. 5a and 5b, above. In this image, while there are two positions 550c and 560c for the cropping area where two points of interest would be captured, in position 560c, the point of interest 530c is only partially contained within the cropping area. In position 550c, both the points of interest are completely contained in the cropping area. Position 550c would thus have a higher score than position 560c, and the system would therefore crop this image at position 550c.

In some embodiments, the points of interest are used as hot-spots for navigation. Users can associate hyperlinks or text with a hot-spot through a graphical user interface. When a viewer watches the image on a client machine, positioning the mouse cursor over a hot-spot can display a text popup, and clicking o the hotspot can perform a navigation action, such as opening a new web-page.

In some embodiments, the points of interest are used as reference points for automatic animation of the image. Different animation styles exist and the user can choose the desired style. For example, one animation style consists of focusing on a point of interest and gradually zooming into it. Another style consists of a slow pan between all of the points of interest in a picture. There are dozens of such styles, all which use the points of interest to generate more intelligent animation.

In some embodiments, the user may have the system assign hot-spots and/or perform animation on the cropped image, or the user may use the system solely to detect points of interest and then use an uncropped image for hot-spots and/or animation.

What is claimed is:

1. A system for editing images comprising:
a processor that receives data representative of an image, the processor coupled to a display;
a user input connected to the processor;
wherein the processor is configured to:
    detect regions of the image representing faces;
    store data representing coordinates of any regions detected as representing faces as points of interest;
    cause the display of the image on the display with an indication of the regions with coordinates stored as points of interest;
    when data indicative of adding a user selected region of the image as an additional point of interest is received through the user input, store data representing the coordinates of the user selected region as a point of interest;
    when data indicative of deleting a region corresponding to an indication of a point of interest on the display is received through the user input, remove data representing the coordinates of the region corresponding to the indication of a point of interest on the display;
    automatically determine a crop area for the image, the crop area having predetermined dimensional characteristics including a predetermined aspect ratio, such that the crop area will maximize the capture of plural regions, both system and user identified, and best preserve points of interest according to a predetermined set of rules;
    cause the display of an indication of the determined crop area on the display;
    wherein the predeterminded set of rules includes maximizing the number of points of interest in the crop area and minimizing the intersection of borders of the crop area with stored points of interest; and
    wherein the determined crop area is selected from a set of potential crop areas based on a score which higher for crop areas which satisfy the predeterminded rules.

2. The system of claim 1 wherein the predetermined dimensional characteristics of the crop area are determined based on data received by the processor from the user input.

3. The system of claim 1 wherein the predetermined set of rules are determined, at least in part, based on data received by the processor from the user input.

4. A method for editing images implemented in a processor that receives data representative of an image, the processor coupled to a display and a user input connected to the processor, the method comprising:
    detecting regions of the image representing faces;
    storing data representing the coordinates of any regions detected as representing faces as points of interest;
    causing the display of the image on the display with an indication of the regions with coordinates stored as points of interest;
    when data indicative of adding a user selected region of the image as an additional point of interest is received through the user input, storing data representing the coordinates of the user selected region as a point of interest;
    when data indicative of deleting a region corresponding to an indication of a point of interest on the display is received through the user input, removing data representing the coordinates of the region corresponding to the indication of a point of interest on the display; and
    automatically determine a crop area for the image, the crop area having predetermined dimensional characteristics including a predetermined aspect ratio, such that the crop area will maximize the capture of plural regions, both system and user identified, and best preserve points of interest according to a predetermined set of rules;
    causing the display of an indication of the determined crop area on the display;
    wherein the predeterminded set of rules includes maximizing the number of points of interest in the crop area and minimizing the intersection of borders of the crop area with stored points of interest; and
    wherein the determined crop area is selected from a set of potential crop areas based on a score which higher for crop areas which satisfy the predeterminded rules.

5. The method of claim 4 wherein the predetermined dimensional characteristics of the crop area are determined based on data received by the processor from the user input.

6. The method of claim 4 wherein the predetermined set of rules are determined, at least in part, based on data received by the processor from the user input.

* * * * *